United States Patent
Dattilo

(10) Patent No.: US 11,406,938 B2
(45) Date of Patent: Aug. 9, 2022

(54) PROCESS FOR OBTAINING CARBON DIOXIDE FROM FURNACE COMBUSTION FUMES

(71) Applicant: LEONARDO S.p.A, Rome (IT)

(72) Inventor: Alessandro Dattilo, Santa Maria Capua Vetere (IT)

(73) Assignee: LEONARDO S.P.A., Rome (IT)

( * ) Notice: Subject to any disclaimer, the term of this patent is extended or adjusted under 35 U.S.C. 154(b) by 209 days.

(21) Appl. No.: 16/941,592

(22) Filed: Jul. 29, 2020

(65) Prior Publication Data
US 2021/0031142 A1    Feb. 4, 2021

(30) Foreign Application Priority Data

Jul. 30, 2019    (IT) .......................... 102019000013281

(51) Int. Cl.
| B01D 53/14 | (2006.01) |
| B01D 53/00 | (2006.01) |
| B01D 5/00  | (2006.01) |
| B01D 53/92 | (2006.01) |

(52) U.S. Cl.
CPC .......... *B01D 53/92* (2013.01); *B01D 53/002* (2013.01); *B01D 53/1475* (2013.01); *B01D 2253/108* (2013.01); *B01D 2253/202* (2013.01)

(58) Field of Classification Search
None
See application file for complete search history.

(56) References Cited

U.S. PATENT DOCUMENTS

| 2,011,551 A | 8/1935 | Hasche |
| 2009/0075219 A1* | 3/2009 | Vilagines ................ F04D 31/00 431/3 |
| 2012/0009109 A1* | 1/2012 | Wright ................ B01D 53/864 423/247 |
| 2014/0116358 A1* | 5/2014 | Stallman ................ F23C 99/00 122/23 |
| 2016/0256819 A1 | 9/2016 | Kulkarni |
| 2018/0236395 A1 | 8/2018 | Naito |

FOREIGN PATENT DOCUMENTS

| EP | 2574392 A1  | 4/2013 |
| JP | H10273301 A | 10/1998 |

OTHER PUBLICATIONS

Search Report for IT201900013281 dated Mar. 12, 2020.

* cited by examiner

*Primary Examiner* — Philip Y Louie
(74) *Attorney, Agent, or Firm* — ArentFox Schiff LLP; Michael Fainberg

(57) ABSTRACT

A process for obtaining carbon dioxide from furnace combustion fumes is provided. The process comprises removing water vapour occurring in combustion fumes through successive gas compression and expansion steps; separating carbon dioxide from oxygen and nitrogen through the use of a filter comprising a gas-separating material, including fullerenes and zeolites, to obtain substantially pure gaseous carbon dioxide; subsequently optionally producing dry ice through further steps of compression and expansion of the substantially pure gaseous carbon dioxide obtained in the preceding steps.

11 Claims, 1 Drawing Sheet

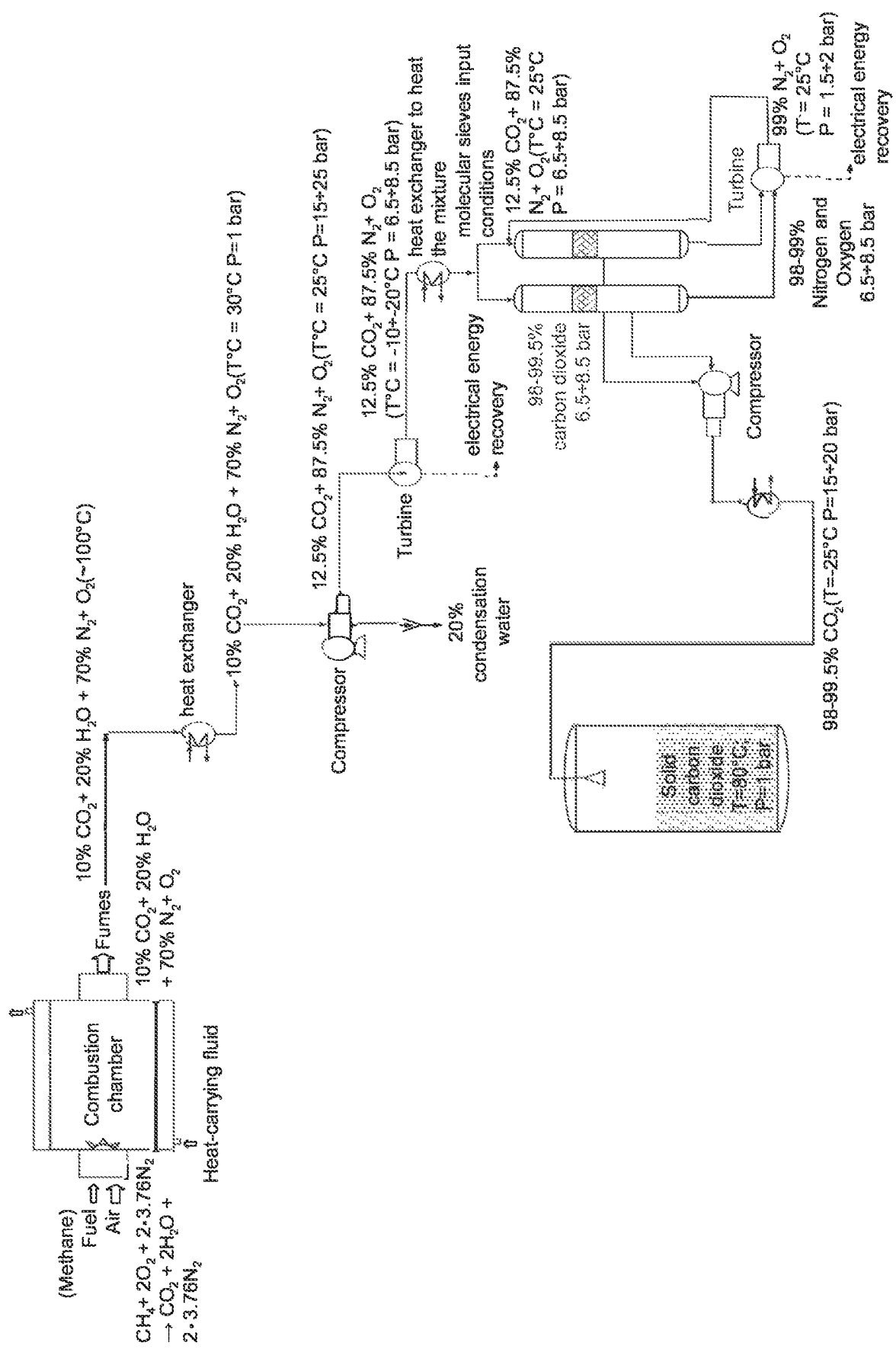

PROCESS FOR OBTAINING CARBON DIOXIDE FROM FURNACE COMBUSTION FUMES

CROSS-REFERENCE TO RELATED APPLICATION

This application claims priority to Italian Patent Application No. 102019000013281 filed on Jul. 30, 2019, the entire contents of which is hereby incorporated in its entirety by reference.

FIELD OF THE INVENTION

The present invention generally falls within the field of processes for the recovery and reuse of carbon dioxide present in combustion fumes which, as is known, are significantly enriched in carbon dioxide compared to the quantity of this gas in the air. More specifically, the invention relates to a process for obtaining carbon dioxide from furnace combustion fumes ("furnace fumes"), and optionally, for the subsequent production of dry ice.

BACKGROUND OF THE INVENTION

Combustion of methane or other hydrocarbons, such as diesel oil and fuel oil, in furnaces produces fumes containing a high percentage of carbon dioxide. As is known, carbon dioxide is the main gas responsible for the greenhouse effect. It would therefore be desirable to have a low cost process for the recovery and reuse of carbon dioxide produced by combustion in furnaces. In fact, this gas is an industrial waste and a substance harmful to the environment. The recovery of carbon dioxide from furnace fumes, to make it available for reuse in various types of industrial processes, would prevent its release into the atmosphere, with significant benefits both in economic and environmental terms.

Carbon dioxide is contained in the air at a percentage of 0.041%. Its separation from the other gases that make up the air, i.e. oxygen (20.9%) and nitrogen (78.09%), would therefore require the filtration of huge quantities of air, with significant energy consumption and poor yield. Given the high costs and low production yields, there is currently no large demand for industrial carbon dioxide production. In the industry, in fact, it is mainly produced as a waste from air distillation for the production of oxygen and nitrogen, for which, instead, there is great demand. Being able to recover carbon dioxide from combustion fumes in a simple and inexpensive way would therefore represent a fundamental step in making this product available for advantageous use in industrial processes in which it is suitable for use, such as, for example, in the degreasing and cleaning of aluminium, steel, titanium and related alloys for aeronautical and other parts and equipment, for acid correction of galvanic baths, treatment of waste water, maintenance of the cold chain and environmental conditioning.

The availability of low-cost carbon dioxide would therefore allow these and other industrial processes to be improved and be made more efficient and economic.

SUMMARY OF THE INVENTION

In order to meet these and other needs and overcome the limitations of the prior art, the present invention provides a process for obtaining carbon dioxide from furnace combustion fumes, comprising the steps of:

(a) discharging combustion fumes from a furnace, wherein the combustion fumes contain carbon dioxide-enriched air and water vapour;

(b) compressing the furnace combustion fumes to a pressure value P1, wherein P1 is higher than an atmospheric pressure, while cooling the furnace combustion fumes during compression so that their temperature does not exceed 80° C., thereby obtaining formation of liquid water and of a compressed gas which contains carbon dioxide-enriched air;

(c) separating the liquid water from the compressed gas;

(d) expanding the compressed gas to a pressure value P2, wherein P2 is higher than the atmospheric pressure and lower than P1, thereby obtaining an expanded gas; and (e) separating the carbon dioxide by passing the expanded gas obtained in the preceding step through a filter comprising a gas-separating material selected from the group consisting of fullerenes, natural zeolites, synthetic zeolites, aluminum phosphates, polymeric cyano-complexes and any combination thereof, thereby obtaining substantially pure gaseous carbon dioxide.

Advantageously, the process of the invention as defined above allows substantially pure gaseous carbon dioxide to be obtained, which is highly suited to be used for the subsequent production of dry ice.

For the production of dry ice, after the previously defined steps (a) to (e), the following further steps are carried out:

(f) compressing the substantially pure gaseous carbon dioxide obtained in step (e) to a pressure value P3, wherein P3 is higher than the atmospheric pressure, while cooling the gaseous carbon dioxide during compression; and (g) expanding the carbon dioxide to atmospheric pressure (i.e. approximately 1 bar), thereby obtaining rapid cooling of the carbon dioxide and formation of dry ice.

According to a preferred embodiment of the process of the invention, the combustion fumes employed in step (a) have a carbon dioxide concentration ranging from 8% to 15%. It is understood by the person skilled in the art that the concentration of carbon dioxide in combustion fumes depends on various factors, including the type of furnace and the type of fuel used in it. Typically, methane furnaces produce combustion fumes having a carbon dioxide concentration ranging from 8% to 12%; diesel oil furnaces produce combustion fumes having a carbon dioxide concentration ranging from 10% to 15%; fuel oil furnaces produce combustion fumes having a carbon dioxide concentration ranging from 9% to 14%.

As indicated above, the combustion fumes used as the starting material for obtaining carbon dioxide also contain water vapour, which typically has a concentration ranging from 15% to 25%.

Of course, after the first compression step (step (b)) and the subsequent liquid water separation step (step (c)) of the process, the concentration of carbon dioxide in the compressed gas is increased.

In a preferred embodiment, the compression in step (b) is carried out at a pressure value between 15 and 25 bar. The optimal pressure in this step is about 15 bar.

The compression in step (b) is carried out by cooling the gas so that its temperature does not exceed 80° C., and it is generally preferred to cool to a temperature ranging from 20° C. to 50° C. Further preferred temperature values in this step are 25° C., 30° C., 35° C., 40° C. or 45° C.

According to a preferred embodiment, the compression in step (b) is achieved by using a compressor, and the liquid water obtained in step (c) is separated by purging it from the bottom of the compressor.

After the separation of the liquid water, the compressed gas obtained in step (b) is expanded in step (d) at a pressure P2 higher than the atmospheric pressure and lower than P1, generally between 5 and 14 bar. It is preferred that this expansion step is carried out without adjusting the gas temperature.

According to a preferred embodiment, the expansion step (d) is carried out by using a turbine, i.e. an electricity generator that recovers the potential and kinetic energies dissipated by the gas pressure reduction phenomenon.

Subsequently, in step (e), the expanded gas is sent to a filter comprising a gas-separating material, through which the carbon dioxide contained in the expanded gas is separated from the other gases therein, i.e. mainly oxygen and nitrogen. Suitable gas separation materials are known per se to the person skilled in the art and include fullerenes (preferably buckytubes, also referred to as "carbon nanotubes"), or molecular sieves such as natural zeolites, synthetic zeolites, aluminium phosphates, polymer cyano-complexes, and combinations thereof.

Preferred gas separation materials within the scope of the present invention are fullerenes (more preferably carbon nanotubes) and zeolites (preferably 4-angstrom synthetic zeolites). Without wishing to be bound by any theory, it is believed that carbon dioxide separation is due to the fact that, as the carbon dioxide molecule is much larger than the nitrogen and oxygen molecules, the frequency of impacts against the fullerene structure or other gas separation materials is considerably less, so that adsorption of CO2 molecules onto the separation material is greater compared to the O2 and N2 molecules, which ultimately allows CO2 to be separated from O2 and N2. Washing the filter with low pressure air (preferably between 1.5 and 2 bar) allows the carbon dioxide to be desorbed from the filter and separated from oxygen and nitrogen. Therefore, after a variable time generally comprised between 10 and 30 minutes (a time that in any case is dependent on the size of the column containing the fullerenes and/or zeolites and their compactness therein), the gas coming out of the filter is made up of highly concentrated, substantially pure gaseous carbon dioxide.

Within the scope of the present description, the expression "substantially pure" is intended to mean a purity of about 99.0%, about 99.1%, about 99.3%, about 99.4%, about 99.5%, about 99.6%, about 99.7%, about 99.8%, about 99.9% or about 100%.

In a preferred embodiment, the filter used in the process of the invention is a column filled with the gas-separating material (preferably carbon nanotubes and/or zeolites) and the expanded gas in step (e) is sent to the column under pressure, preferably between 6.5 and 8.5 bar. Even more preferably, in the process of the invention two columns are used in parallel, one under pressure and the other for washing, alternating repeatedly so as to obtain a constant output flow of substantially pure gaseous carbon dioxide.

As indicated above, the substantially pure gaseous carbon dioxide obtained by the process of the invention can be advantageously used for the production of dry ice, i.e. carbon dioxide in the solid form.

For this purpose, the flow of substantially pure gaseous carbon dioxide obtained in step (d) is first compressed (step (e)), preferably by means of a compressor, to a pressure P3, wherein P3 is higher than the atmospheric pressure, while cooling, and then expanded to atmospheric pressure (about 1 bar), generally without adjusting the temperature (step (f)). The cooling temperature in step (e) is preferably about −25° C. and the pressure P3 is preferably between 15 and 25 bar. With the subsequent expansion, the temperature of the carbon dioxide rapidly decreases, down to about −80° C., resulting in the formation of dry ice.

The process of the present invention advantageously allows carbon dioxide to be produced in a simple and inexpensive way, in both the gaseous and the solid form, by recovering it from furnace combustion fumes, thereby preventing its dispersion into the atmosphere, with significant environmental advantages.

In addition, the carbon dioxide obtained finds various applications in the industry, where it lends itself to be exploited in various forms. Carbon dioxide in the solid form, that is, as dry ice, can in fact be used as a mild abrasive ("Drice Blastig") for cleaning tools, and in the aeronautical field, for stripping entire aeroplanes. Another industrial use of carbon dioxide in the solid form is in the cold chain, since the temperature of dry ice is −50° C. at ambient pressure. Through the use of heat pumps, it would therefore be possible to take advantage of the low temperature of dry ice for conditioning the environment and refrigerators. Carbon dioxide in the form of gas can be used to acidify chemical treatment baths for aeronautical parts or other industrial components, as well as in the treatment of waste water. Lastly, supercritical carbon dioxide can be used as an agent for degreasing small parts or for cleaning pipes, which processes are currently carried out with solvents or chemicals that however exhibit environmental impact problems.

BRIEF DESCRIPTION OF THE DRAWING

Further features and advantages of the invention will be apparent from the detailed description which follows, given purely by way of non-limiting example, with reference to FIGURE that Shows a Flowchart of a Preferred Embodiment of the Process of the Invention.

DETAILED DESCRIPTION

FIGURE schematically shows the combustion chamber of a furnace using methane as the fuel and air as the comburent. The heat generated by combustion is used to heat a heat-carrying fluid, for example water, which is circulated in the distribution system of the plant for heating and producing hot water. The combustion fumes leaving the combustion chamber of the furnace have a composition of about 10% $CO_2$, about 20% $H_2O$ (water vapour) and about 70% $O_2+N_2$. According to the prior art, the furnace combustion fumes are simply cooled, with the aid of a cooling tower, from a temperature of about 100° C. to a temperature of about 30° C. (which causes the formation of water vapour), and released into the atmosphere. According to the embodiment of the process of the invention shown in FIGURE, the combustion fumes leaving the combustion chamber of the furnace after being filtered to eliminate any solid microparticles present in the fumes, which tend to saturate the gas separation columns are sent to a heat exchanger to reduce its temperature to about 30° C. at atmospheric pressure (about 1 bar). Subsequently, they are sent to a compressor for compression to a pressure of between 15 and 25 bar, while cooling to approximately 25° C. Compression causes the formation of liquid water (condensation water), which is purged from the bottom of the compressor and reused for various industrial and/or domestic needs, with the advantage that, as it is free of calcium and other mineral salts, it does not cause scaling.

The composition of the remaining gas after the separation of the liquid water is approximately 12.5% $CO_2$ and approximately 87.5% $O_2+N_2$. In the following step, the gas is sent to a turbine to be expanded to a pressure of between 6.5 and 8.5 bar, with recovery of electrical energy. Upon expansion, the gas cools to a temperature between about −10° C. and about −20° C. During expansion the composition of the gas does not change. After expansion, the gas is sent to a heat exchanger to be heated to about 25° C. and sent to a pair of column filters filled with carbon nanotubes and/or 4-angstrom synthetic zeolites as a $CO_2$ separation material. The carbon dioxide retained by the carbon nanotubes and/or zeolites is released when the column is washed with low pressure air (1.5-2 bar). The operation of the system is discontinuous, so each one of the two columns is alternately washed with low pressure air in order to obtain a constant output flow of gaseous carbon dioxide having a purity of about 98-99.5%. The filtered, carbon dioxide-free air exiting the columns can be sent to a turbine to be expanded to a pressure of between 1.5 and 2 bar, with recovery of electrical energy, and subsequently alternately recirculated through each of the two columns to wash and release the carbon dioxide retained therein.

The gaseous carbon dioxide exiting the columns is sent to a compressor to compress it to a pressure of between 15 and 20 bar, while cooling to a temperature of around −25° C. The subsequent step of expansion to atmospheric pressure causes a drastic and rapid decrease in the temperature of carbon dioxide, to approximately −80° C., resulting in the formation of solid carbon dioxide (carbonic snow). The carbonic snow produced can be mechanically compressed into cubes that are easy to store and transport.

What is claimed is:

1. A process for obtaining carbon dioxide from furnace combustion fumes, the process comprising the steps of:
   (a) discharging combustion fumes from a furnace, wherein the combustion fumes contain carbon dioxide-enriched air and water vapour;
   (b) compressing the furnace combustion fumes to a pressure value P1, wherein P1 is higher than an atmospheric pressure, while cooling the furnace combustion fumes during compression so that their temperature does not exceed 80° C., thereby obtaining formation of liquid water and of a compressed gas which contains carbon dioxide-enriched air;
   (c) separating the liquid water from the compressed gas obtained in the preceding step;
   (d) expanding the compressed gas to a pressure value P2, wherein P2 is higher than the atmospheric pressure and is lower than P1, thereby obtaining an expanded gas; and
   (e) separating the carbon dioxide by passing the expanded gas obtained in the preceding step through a filter comprising a gas-separating material selected from the group consisting of fullerenes, natural zeolites, synthetic zeolites, aluminum phosphates, polymeric cyano-complexes and any combination thereof, thereby obtaining substantially pure gaseous carbon dioxide.

2. The process of claim 1, wherein the combustion fumes employed in step (a) have a carbon dioxide concentration ranging from 8% to 15%.

3. The process of claim 1, wherein purity of the carbon dioxide obtained in step (e) is from 99% to 100%.

4. The process of claim 1, wherein in step (b) P1 is between 15 and 25 bar.

5. The process of claim 1, wherein in step (b) the furnace combustion fumes are cooled to a temperature ranging from 20° C. to 50° C.

6. The process of claim 1, wherein in step (d) P2 is between 5 and 14 bar.

7. The process of claim 1, wherein in step (d) P2 is between 6.5 and 8.5 bar.

8. The process of claim 1, wherein expansion in step (d) is carried out by a turbine.

9. The process of claim 1, further comprising the steps of:
   (f) compressing the substantially pure gaseous carbon dioxide obtained in step (e) to a pressure value P3, wherein P3 is higher than the atmospheric pressure, while cooling the carbon dioxide during compression; and
   (g) expanding the carbon dioxide to the atmospheric pressure, thereby obtaining rapid cooling of the carbon dioxide and formation of solid carbon dioxide.

10. The process of claim 9, wherein in step (f) P3 is between 15 and 25 bar.

11. The process of claim 9, wherein in step (f) the carbon dioxide is cooled to a temperature between −20° C. and −30° C.

* * * * *